(12) United States Patent  
Kitaguchi et al.

(10) Patent No.: US 7,428,007 B2
(45) Date of Patent: *Sep. 23, 2008

(54) IMAGE PICKUP APPARATUS AND IMAGE PROCESSING METHOD FOR PICKING UP AN IMAGE OF A TARGET IN DIVISIONS

(75) Inventors: Takashi Kitaguchi, Kanagawa (JP); Norihiko Murata, Kanagawa (JP); Shin Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/176,660

(22) Filed: Jul. 8, 2005

(65) Prior Publication Data

US 2005/0243197 A1 Nov. 3, 2005

Related U.S. Application Data

(63) Continuation of application No. 09/693,986, filed on Oct. 23, 2000, now Pat. No. 6,947,076.

(30) Foreign Application Priority Data

Oct. 27, 1999 (JP) ................................. 11-305233

(51) Int. Cl.
*H04N 7/00* (2006.01)
*H04N 5/225* (2006.01)
(52) U.S. Cl. .................. 348/218.1; 348/36; 348/333.01
(58) Field of Classification Search .................. 348/36, 348/218.1, 333.01, 333.05, 333.11, 333.12
See application file for complete search history.

(56) References Cited

U.S. PATENT DOCUMENTS

| 4,589,029 | A | 5/1986 | Torimaru et al. |
| 5,138,460 | A | 8/1992 | Egawa |
| 5,754,230 | A | 5/1998 | Tsuruta |
| 5,880,778 | A | 3/1999 | Akagi |
| 5,907,353 | A * | 5/1999 | Okauchi ................. 348/218.1 |
| 6,639,625 | B1 | 10/2003 | Ishida et al. |
| 6,657,667 | B1 | 12/2003 | Anderson |
| 6,720,997 | B1 | 4/2004 | Horie et al. |
| 6,947,076 | B1 * | 9/2005 | Kitaguchi et al. ........ 348/218.1 |

FOREIGN PATENT DOCUMENTS

| JP | 8-265626 | 10/1996 |
| JP | 10-155109 | 6/1998 |
| JP | 10-186551 | 7/1998 |
| JP | 10304227 | 11/1998 |
| JP | 11-075108 | 3/1999 |
| JP | 11-196318 | 7/1999 |

\* cited by examiner

*Primary Examiner*—Lin Ye
*Assistant Examiner*—Timothy J Henn
(74) *Attorney, Agent, or Firm*—Oblon, Spivak, McClelland, Maier & Neustadt, P.C.

(57) ABSTRACT

An image pickup apparatus for picking up an image of a target object in divisions as a plurality of partial images which overlap by a predetermined quantity, is provided with a field angle setting unit configured to set a field angle with which the target object is to be picked up, a display unit for displaying an image, and an image generating unit for generating the partial images to be displayed on the display unit by dividing an image of the target object which is picked up with the field angle.

18 Claims, 12 Drawing Sheets

PRIOR ART FIG.1A
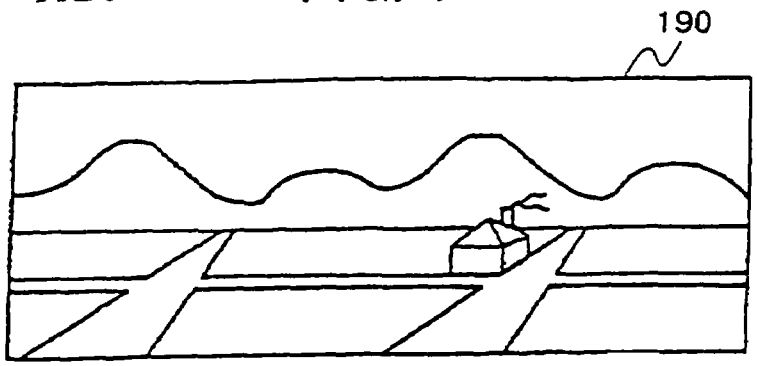
FIG.1B
PRIOR ART
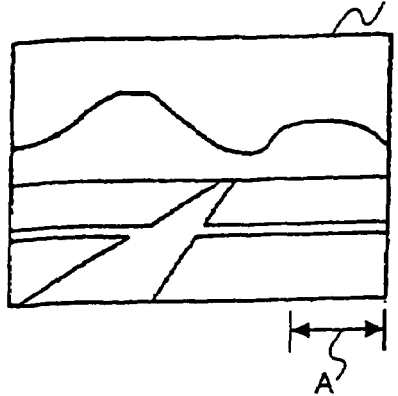
FIG.1C
PRIOR ART
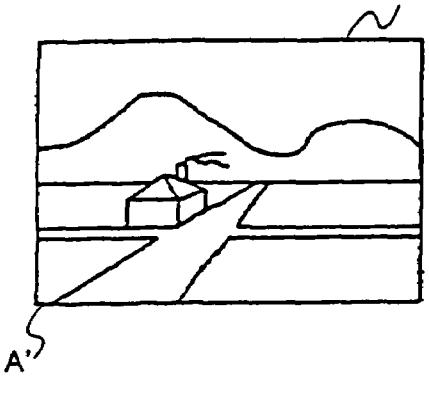
FIG.1D
PRIOR ART
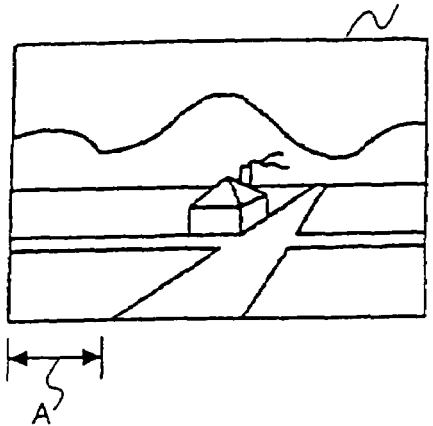

FIG.2A
PRIOR ART
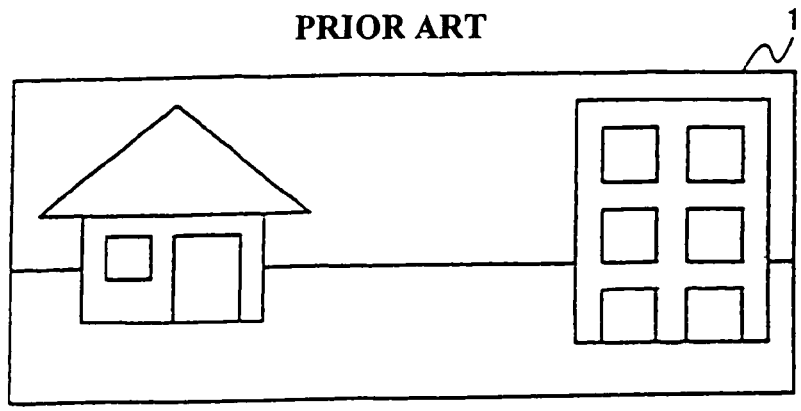
FIG.2B
PRIOR ART
FIG.2C
PRIOR ART
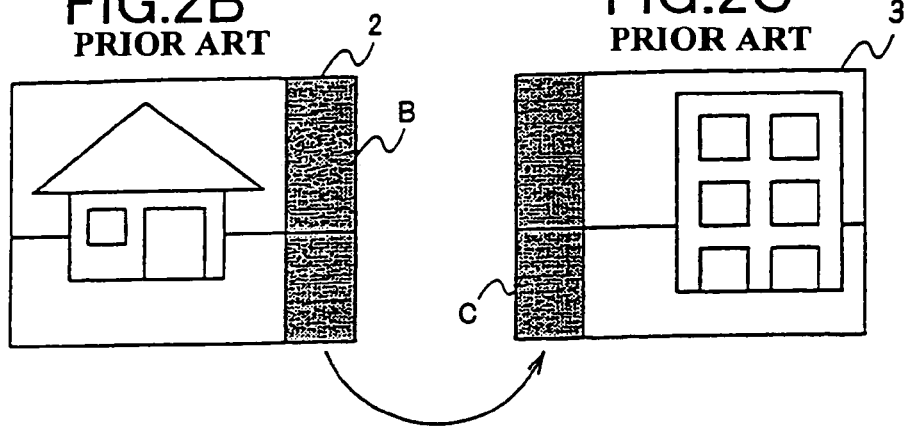
FIG.3
PRIOR ART
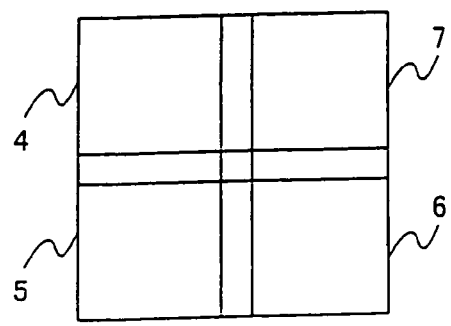

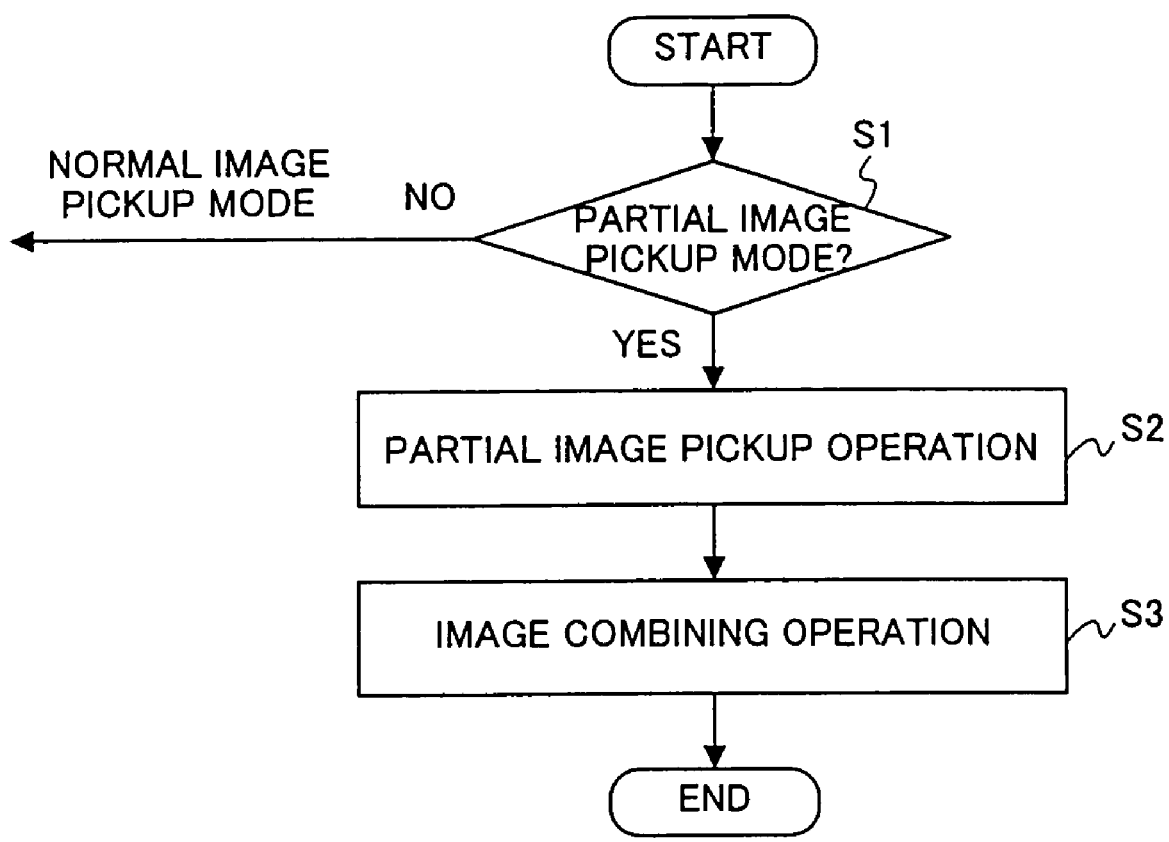

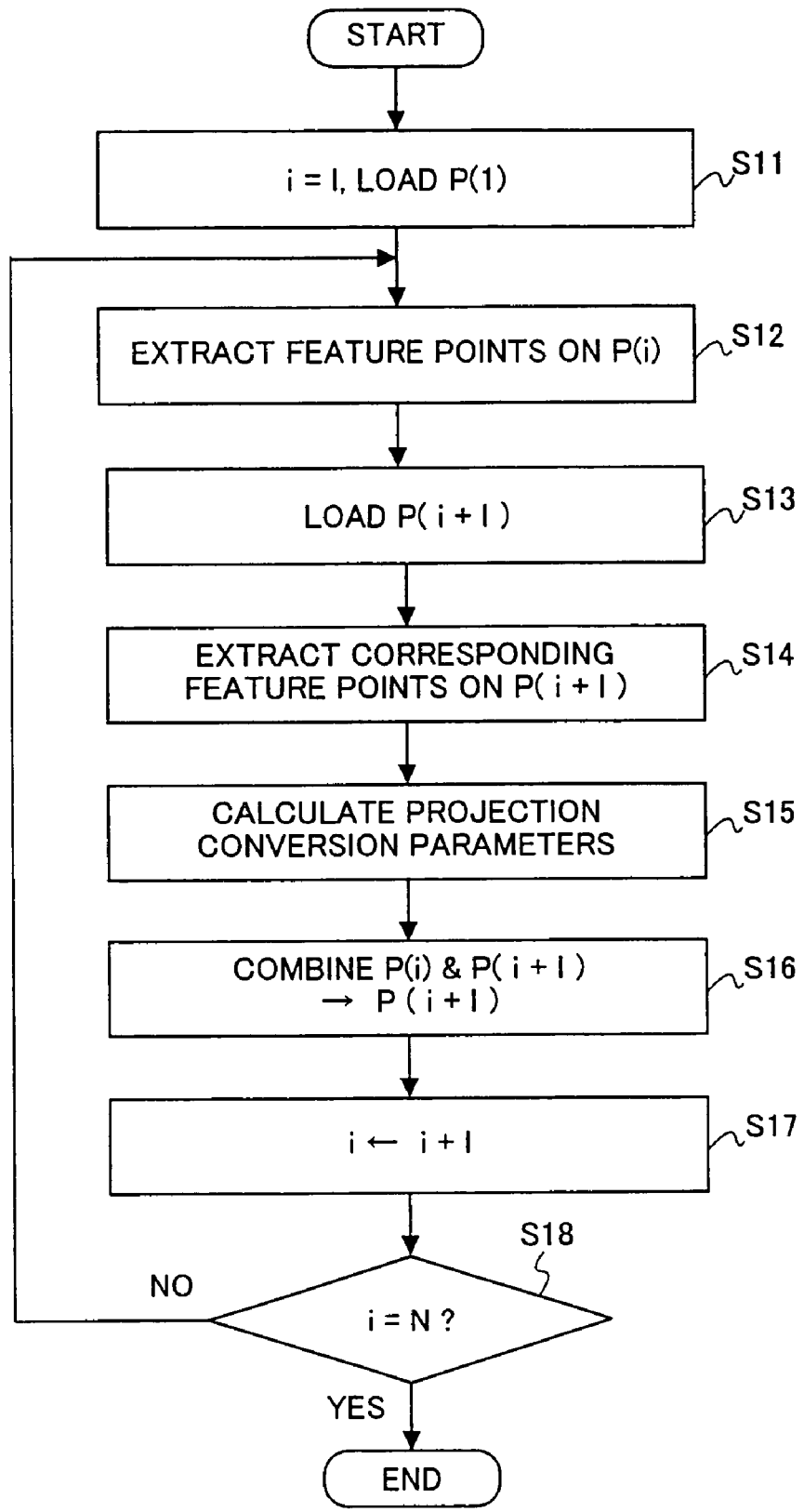

FIG.8A
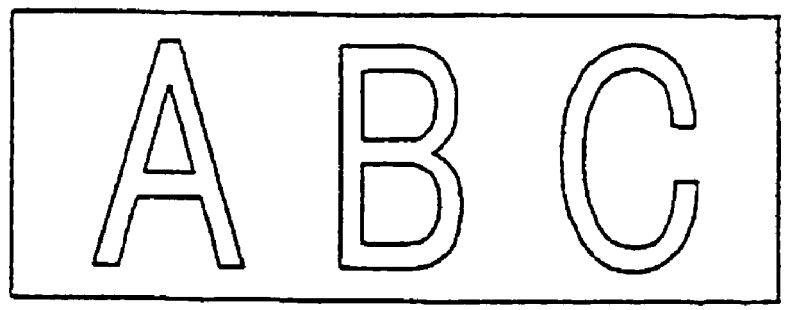
FIG.8B
FIG.8C
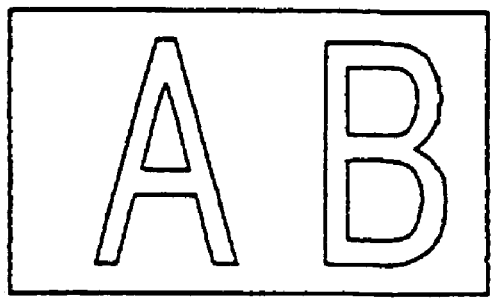 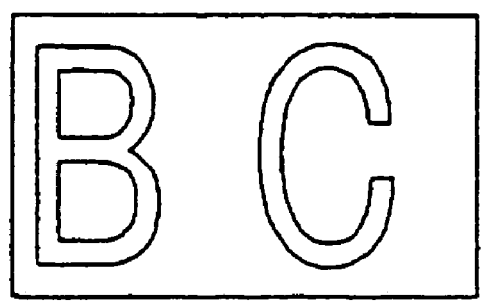
FIG.8D
FIG.8E
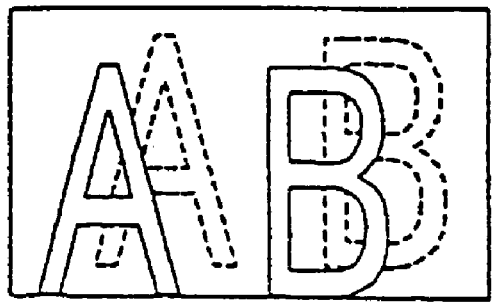 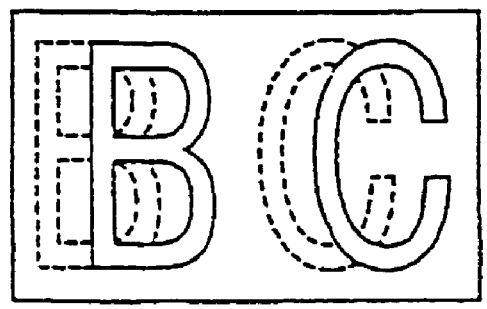

FIG.12A

| MENU | | |
|---|---|---|
| → OVERLAP QUANTITY | | 10% |
| RESOLUTION | | INVALID |
| TARGET OBJECT SIZE | | INVALID |
| NO. OF DIVISIONS | | AUTOMATIC |
| FOCAL DISTANCE | | MANUAL |

FIG.12B

| MENU | | |
|---|---|---|
| OVERLAP QUANTITY | | 10% |
| RESOLUTION | | INVALID |
| TARGET OBJECT SIZE | | INVALID |
| NO. OF DIVISIONS | | AUTOMATIC |
| → FOCAL DISTANCE | | 100mm |

FIG.12C

| MENU | | |
|---|---|---|
| OVERLAP QUANTITY | | 10% |
| → RESOLUTION | | 200dpi |
| TARGET OBJECT SIZE | | INVALID |
| NO. OF DIVISIONS | | AUTOMATIC |
| FOCAL DISTANCE | | AUTOMATIC |

FIG.12D

| MENU | | |
|---|---|---|
| OVERLAP QUANTITY | | 10% |
| RESOLUTION | | 200dpi |
| → TARGET OBJECT SIZE | | A4HORIZONTAL |
| NO. OF DIVISIONS | | AUTOMATIC |
| FOCAL DISTANCE | | AUTOMATIC |

FIG.12E

| MENU | | |
|---|---|---|
| OVERLAP QUANTITY | | 10% |
| RESOLUTION | | INVALID |
| TARGET OBJECT SIZE | | INVALID |
| → NO. OF DIVISIONS | | 3 |
| FOCAL DISTANCE | | AUTOMATIC |

IMAGE PICKUP APPARATUS AND IMAGE PROCESSING METHOD FOR PICKING UP AN IMAGE OF A TARGET IN DIVISIONS

This application claims the benefit of a Japanese Patent Application No.11-305233 filed Oct. 27, 1999, in the Japanese Patent Office, the disclosure of which is hereby incorporated by reference. This application claims priority under 35 U.S.C. § 120 to U.S. Ser. No. 09/693,986.

BACKGROUND OF THE INVENTION

1. Field of the Invention

The present invention generally relates to image pickup apparatuses and image processing methods, and more particularly to an image pickup apparatus which picks up an image in divisions and to an image processing method which processes the image which is picked up in divisions.

2. Description of the Related Art

Digital cameras have become increasingly popular. The increasing popularity of the digital camera was gained by the ease with which the image can be processed as digital information, matching the recent trend of processing various kinds of data electronically. In addition, it would be extremely troublesome to convert the image which is picked up by a conventional camera using a silver film into the digital information.

The digital camera can be used in various applications to bring out the advantageous features thereof. However, the resolution of the image which is picked up by the digital camera is not as high compared to that picked up by the conventional camera using the silver film. Although recently, the number of pixels of a CCD image pickup element used in the digital camera has increased, it is still not large enough for picking up extremely fine characters and patterns with a satisfactory reproducibility.

Accordingly, a method has been proposed to obtain partial images by picking up parts of a target object with a narrow field angle, and combining the partial images to generate a full image of the target object, which is as if the image were picked up by a high-density image pickup element having a large number of pixels with a wide field angle. When generating a high definition image by this proposed method, the following points are very important when picking up the partial images.

First, each part of the target object must be included in one of the partial images. If a certain part of the target object is missing from all of the partial images, the full image which is generated by combining the partial images will naturally be missing this certain part. Second, each partial image must have a region which overlaps an adjacent partial image. The partial images are combined based on image information of such overlapping regions. Generally, the accuracy of the image combining process improves as the overlapping regions become larger, but the number of partial images to be picked up consequently increases, to thereby increase the time required to carry out the image combining process.

Accordingly, when picking up the partial images of the target object, each part of the target object must be picked up, and in addition, the overlapping regions must be provided in an appropriate number of partial images. However, such an operation requires a skilled operator to perform, and furthermore, such an operation is extremely troublesome to perform. In view of the above, various methods have been proposed to pick up the partial images that will not put such a burden on the operator who operates the image pickup apparatus.

For example, a Japanese Laid-Open Patent Application No.11-75108 proposes a method which facilitates generation of a combined image 190 shown in FIG. 1A by overlapping a partial image 191 shown in FIG. 1B which is already picked up and a partial image (through-image) 195 shown in FIG. 1C which is to be picked up or, time-divisionally displaying an image 199 shown in FIG. 1D. By displaying the partial images 191 and 195 on a monitor by overlapping a right end portion A of the partial image 191 and a left end portion A' of the partial image 195, the operator adjusts an image pickup range (through-image) of a camera so that the overlapping portions A and A' match, and records the combined image.

On the other hand, a Japanese Laid-Open Patent Application No.10-186551 proposes a method which compares a portion of the partial image which is already picked up and a portion of the present through-image, and records the through-image as one of the partial images if the two compared images match. In addition, this proposed method picks up the full image of the target object, displays the position of the present through-image on the full image, and also displays the position of the partial image which is already picked up on the full image. As a result, this proposed method assists the operation to pick up the partial images so that the overlapping regions of the partial images positively exist and no missing partial image of the target object exists.

However, according to the method proposed in the Japanese Laid-Open Patent Application No.11-75108, the overlapping regions of the partial images 191 and 195 are displayed, and for this reason, it is difficult to detect a characterizing feature in the overlapping regions if similar image information continues in the vicinity of the overlapping regions, as described below in conjunction with FIGS. 2A through 2C.

For example, it is assumed for the sake of convenience that the image of a target object 1 shown in FIG. 2A is picked up in two divisions, namely, a left partial image 2 shown in FIG. 2B corresponding to the left part of the target object 1 and a right partial image shown in FIG. 2C corresponding to the right part of the target object 1. A right portion B of the left partial image 2 is displayed in an overlapping manner on a left portion C of the right partial image 3 on the display. However, the image information in the right portion B is substantially the same in the horizontal direction for virtually the entire right portion B, and a position in the right portion B cannot be specified. As a result, it is extremely difficult for the operator to accurately overlap the left and right partial images 2 and 3 so that the right and left portions B and C perfectly match.

On the other hand, when combining the partial images arranged in one direction, as in the case of a panoramic image, a predetermined one of right, left, top and bottom end portions of the partial images is automatically displayed. But in a case where the image of the target object is picked up in four divisions, namely, a top right partial image 4, a bottom left partial image 5, a bottom right partial image 6 and a top right partial image 7 shown in FIG. 3, for example, it is extremely difficult to automatically judge the overlapping end portions of the partial images 4 through 7. For example, if the partial image 4 is picked up first, and the end portion of this partial image 4 is to be displayed in an overlapping manner on the end portion of the partial image (through-image) which is to be picked up next, the end portion to be overlapped differs depending on whether the partial image 5 or the partial image 7 is to be picked up next. It is extremely difficult to automatically judge the end portion to be overlapped, and it is also extremely troublesome to manually specify the end portion to be overlapped.

Furthermore, when displaying not only a portion of the image but all of the partial images which are picked up in an overlapping manner, no operation is actually carried out to overlap the end portions. Hence, the operator must carry out a troublesome operation of picking up the through-image while carefully confirming the display on the monitor the correspondence of the left end portion of the through-image and the right end portion of the partial image which is already picked up, for example. In addition, since the display is made on the monitor by only focusing on the overlap between two partial images at two successive image pickup times, the image pickup times do not become consecutive when picking up three or more partial images, and it is impossible to confirm the overlap between the adjacent partial images displayed on the monitor. In other words, in the case of the target object shown in FIG. 3, if the partial images 4, 5, 6 and 7 are picked up in this order, it is impossible to confirm the overlap of the partial images 4 and 7, because the image pickup times of these partial images 4 and 7 are not consecutive. Therefore, the method proposed in the Japanese Laid-Open Patent Application No.11-75108 is not suited for a case where the image of the target object is picked up in divisions such that the adjacent partial images do not become continuous in time.

On the other hand, according to the method proposed in the Japanese Laid-Open Patent Application No.10-186551, the problems of the method proposed in the Japanese Laid-Open Patent Application No.11-75108 are unlikely to occur, since the overlap of the partial images is judged automatically. However, it is necessary to confirm the overlap of the through-image with respect to all of the partial images which are already picked up, and an extremely large amount of data processing is required for this confirmation. As a result, the required processing time increases, and the cost of the image pickup apparatus also increases. Moreover, there is a limit in the existing processing accuracy with which the overlap of the through-image and the partial image which is already picked up is confirmed, and the reliability of this confirmation process is not very high. Furthermore, there is a high possibility that a part of the image of the target object will not be picked up, since it is impossible to know which partial images have already been picked up.

SUMMARY OF THE INVENTION

Accordingly, it is a general object of the present invention to provide a novel and useful image pickup apparatus and image processing method, in which the problems described above are eliminated.

Another and more specific object of the present invention is to provide an image pickup apparatus for picking up an image of a target object in divisions as a plurality of partial images which overlap by a predetermined quantity, comprising display means for displaying an image, and partial image generating means for generating the partial images to be displayed on the display means by dividing a full image of the target image which is picked up in advance into predetermined sizes using information related to an overlap of the partial images. According to the image pickup apparatus of the present invention, it is possible to realize an image pickup apparatus which can generate a high-definition image by combining the partial images obtained by picking up the target object in divisions. In addition, it is possible to secure the necessary overlapping region that is required when combining the partial images, and to instruct the operator of the parts of the target object to be picked up so that all parts of the target object are picked up without dropout of image information.

A further object of the present invention is to provide an image pickup apparatus for picking up an image of a target object in divisions as a plurality of partial images which overlap by a predetermined quantity, comprising a display unit displaying an image, and a generating unit generating the partial images to be displayed on the display unit by dividing a full image of the target image which is picked up in advance into predetermined sizes using information related to an overlap of the partial images. According to the image pickup apparatus of the present invention, it is possible to realize an image pickup apparatus which can generate a high-definition image by combining the partial images obtained by picking up the target object in divisions. In addition, it is possible to secure the necessary overlapping region that is required when combining the partial images, and to instruct the operator of the parts of the target object to be picked up so that all parts of the target object are picked up without dropout of image information.

Another object of the present invention is to provide an image pickup apparatus for picking up an image of a target object in divisions as a plurality of partial images which overlap by a predetermined quantity, comprising field angle setting means for setting a field angle with which the target object is to be picked up, display means for displaying an image, and partial image generating means for generating the partial images to be displayed on the display means by dividing a full image of the target image which is picked up with a predetermined field angle set by the field angle setting means into predetermined sizes using the predetermined field angle and information related to an overlap of the partial images after the predetermined field angle is set by the field angle setting means. According to the image pickup apparatus of the present invention, the two images which are displayed in the overlapping manner in the full image are approximately the same, so that the effect of positioning or aligning the two images by the overlapping display is large.

Still another object of the present invention is to provide an image pickup apparatus for picking up an image of a target object in divisions as a plurality of partial images which overlap by a predetermined quantity, comprising a field angle setting unit setting a field angle with which the target object is to be picked up, a display unit displaying an image, and a partial image generating unit generating the partial images to be displayed on the display unit by dividing a full image of the target image which is picked up with a predetermined field angle set by the field angle setting unit into predetermined sizes using the predetermined field angle and information related to an overlap of the partial images after the predetermined field angle is set by the field angle setting unit. According to the image pickup apparatus of the present invention, the two images which are displayed in the overlapping manner in the full image are approximately the same, so that the effect of positioning or aligning the two images by the overlapping display is large.

A further object of the present invention is to provide an image processing method for processing an image of a target object which is picked up by an image pickup apparatus in divisions as a plurality of partial images which overlap by a predetermined quantity, comprising the steps of (a) displaying an image, and (b) generating the partial images to be displayed by the step (a) by dividing a full image of the target image which is picked up in advance into predetermined sizes using information related to an overlap of the partial images. According to the image processing method of the present invention, it is possible to realize an image pickup apparatus which can generate a high-definition image by combining the partial images obtained by picking up the target object in divisions. In addition, it is possible to secure the necessary overlapping region that is required when combining the partial images, and to instruct the operator of the parts of the target object to be picked up so that all parts of the target object are picked up without dropout of image information.

Another object of the present invention is to provide an image processing method for processing an image of a target object which is picked up by an image pickup apparatus in divisions as a plurality of partial images which overlap by a predetermined quantity, comprising the steps of (a) setting a field angle with which the target object is to be picked up, (b) displaying an image, and (c) generating the partial images to be displayed by the step (b) by dividing a full image of the target image which is picked up with a predetermined field angle set by the step (a) into predetermined sizes using the predetermined field angle and information related to an overlap of the partial images after the predetermined field angle is set by the step (a). According to the image processing method of the present invention, the two images which are displayed in the overlapping manner in the full image are approximately the same, so that the effect of positioning or aligning the two images by the overlapping display is large.

Other objects and further features of the present invention will be apparent from the following detailed description when read in conjunction with the accompanying drawings.

BRIEF DESCRIPTION OF THE DRAWINGS

FIGS. 1A through 1D are diagrams for explaining a method proposed in a Japanese Laid-Open Patent Application No.11-75108;

FIGS. 2A through 2C are diagrams for explaining the method proposed in the Japanese Laid-Open Patent Application No.11-75108;

FIG. 3 is a diagram for explaining the method proposed in the Japanese Laid-Open Patent Application No.11-75108;

FIG. 5 is a flow chart for explaining the operation of the first embodiment of the image pickup apparatus;

FIG. 6 is a flow chart for explaining the image combining operation of the first embodiment of the image pickup apparatus;

FIG. 8A through 8E are diagrams for explaining partial images which are picked up by the first embodiment of the image pickup apparatus;

FIGS. 12A through 12E are diagrams showing menus which are displayed in second, third, fifth, seventh and ninth embodiments of the image pickup apparatus according to the present invention;

DESCRIPTION OF THE PREFERRED EMBODIMENTS

Figure 4:
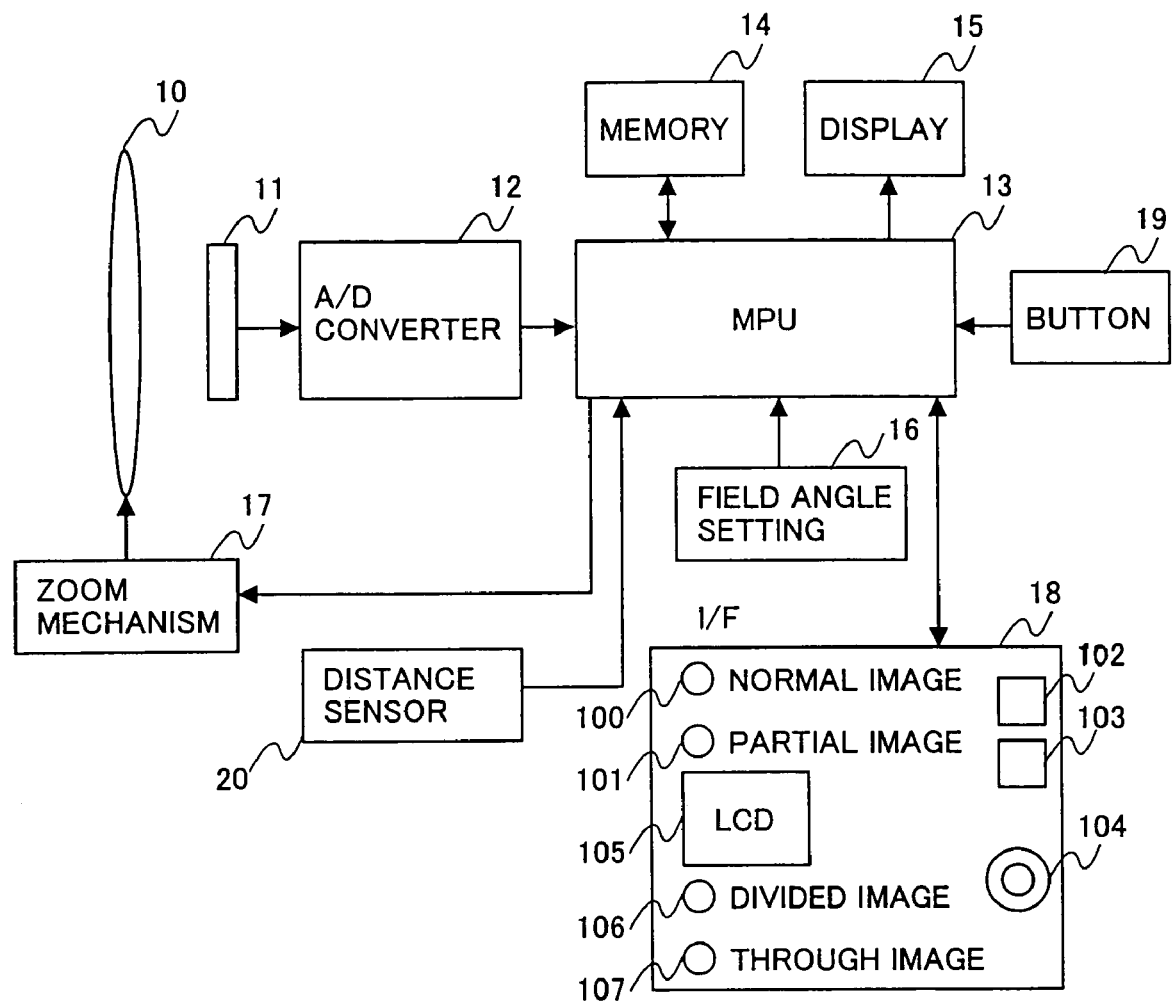
FIG. 4 is a diagram for explaining a first embodiment of an image pickup apparatus according to the present invention.

FIG. 4 is a diagram for explaining a first embodiment of an image pickup apparatus according to the present invention. This first embodiment of the image pickup apparatus employs a first embodiment of an image processing method according to the present invention. In this first embodiment, the present invention is applied to an image pickup apparatus made of a digital camera.

In FIG. 4, an image of a target object is imaged on a surface of an image pickup element 11 via a lens 10, and the image is converted into an image signal by the image pickup element 11. The image signal from the image pickup element 11 is converted into a digital image signal by an analog-to-digital (A/D) converter 12, and is supplied to a MPU 13 which functions as a signal processing means and a control means.

The MPU 13 carries out various processes, including a correction process and a compression process, with respect to the digital image signal received via the A/D converter 12, and stores the processed image signal in an image memory 14. A display unit 15 is made of a liquid crystal display (LCD) or the like, and displays an image under the control of the MPU 13, such as an image (through-image) which is presently being picked up by the image pickup element 11, the image immediately prior to being stored in the image memory 14, and the image stored in the image memory 14.

A field angle setting unit 16 variably sets a field angle with which the image is to be picked up, by varying a zoom magnification by varying a focal distance of the lens 10 in response to an instruction from the operator. In this state, the field angle setting unit 16 supplies a field angle varying signal to a zoom mechanism 17 via the MPU 13, and the zoom mechanism 17 varies the focal distance of the lens 10 by driving the lens 10 and the like in response to the field angle varying signal.

An interface (I/F) 18 forms an interface for functions other than varying the field angle. The interface 18 includes a LED 100 which turns ON during a normal image pickup mode, a LED 101 which turns ON during a partial (or divided) image pickup mode, a switch 102 which is pushed to switch the image pickup mode to the normal image pickup mode, a switch 103 which is pushed to switch the image pickup mode to the partial (or divided) image pickup mode, a power switch 104 which is pushed to turn the power supply ON/OFF, a LCD 105 for displaying the state of the camera, a LED 106 which turns ON when a divided image is being displayed, and a LED 107 which is turned ON when a through image is being displayed. Although omitted in FIG. 4, the interface 18 also includes an image switching unit and manipulation buttons which will be described later. The image switching unit may be formed by one or more switches.

The divided image is an image which is obtained when the full (or entire) image of a target object is divided according to the present invention, and is displayed as a guide when picking up a partial image. The partial image is an image which is obtained by picking up only a part of the target object or, an image which is to be obtained by picking up only a part of the target object. The through image is a motion picture which is continuously picked up, and is continuously displayed on the display unit 15. The through image is not held in the image memory 14.

A release button 19 is coupled to the MPU 13, and is manipulated when inputting the image. Further, a distance sensor 20 is coupled to the MPU 13 for detecting and inputting a distance to a target object which is measured by a known means.

Next, a description will be given of the operation of this first embodiment when combining partial images. FIG. 5 is a flow chart for explaining the operation of the MPU 13 of this first embodiment.

In FIG. 5, a step S1 decides whether an image pickup is to be carried out in divisions, that is, in the partial image pickup mode. When the image of the target object is to be picked up in divisions, the operator specifies the partial image pickup mode from the mode switching unit 19. If the operator specifies the normal image pickup mode, the decision result in the step S1 is NO, and the image of the target object is picked up as in the case of the conventional image pickup apparatus. That is, in the normal image pickup mode, the image of the target object is picked up as it is without being divided, by use of the lens 10, the image pickup element 11, the A/D converter 12, the MPU 13, the display unit 15 and the field angle setting unit 16. An image signal of the image of the target object picked up in the normal image pickup mode is stored in the image memory 14 and is displayed on the display unit 15.

On the other hand, if the operator specifies the partial image pickup mode, the decision result in the step S1 is YES, and a step S2 carries out a partial image pickup operation. More particularly, the step S2 picks up the image of the target object in divisions, that is, picks up partial images of the target object. The partial images of the target object are picked up by use of the field angle setting unit 16, the lens 10, the image pickup element 11, the A/D converter 12 and the MPU 13. Image signals of the partial images are stored in the image memory 14. Thereafter, a step S3 carries out an image combining operation. In other words, the step S3 combines the partial images by the MPU 13, and generates a single combined image. An image signal of this single combined image is stored in the image memory 14.

Figure 7A:
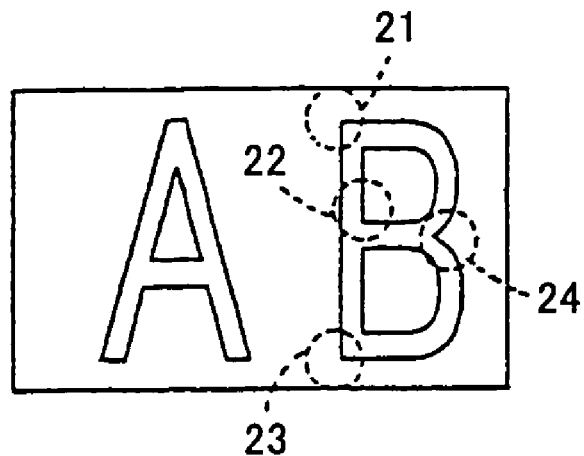
FIGS. 7A through 7C are diagrams for explaining the combining of partial images in the first embodiment of the image pickup apparatus.
Figure 7B:
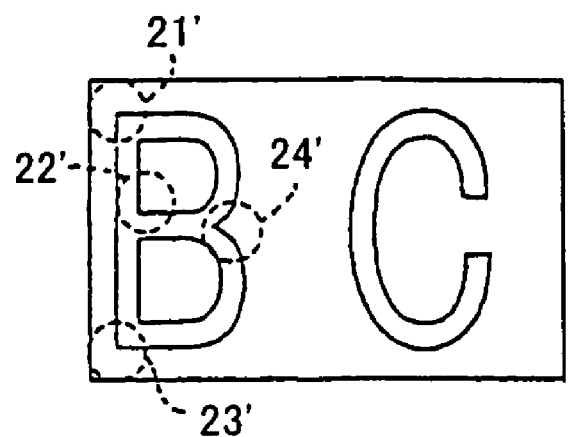
Figure 7C:
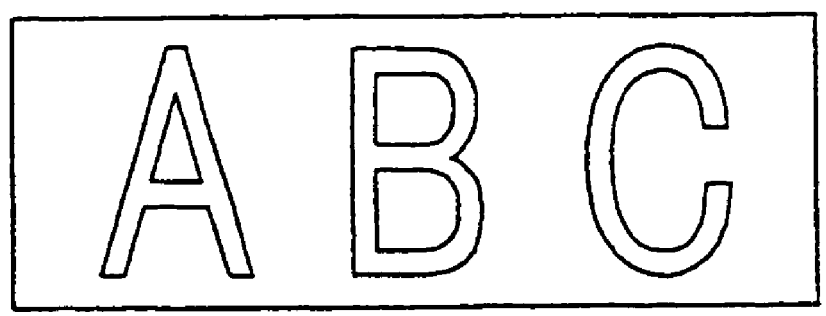

Next, a description will be given of the contents processed during the image combining operation. FIG. 6 is a flow chart for explaining the image combining operation of the step S3 shown in FIG. 5. In addition, FIGS. 7A through 7C are diagrams for explaining the combining of partial images in this first embodiment. For the sake of convenience, a partial image of the target object is denoted by P(i), where i=1, ..., N, and it is assumed that a total of N partial images of the target object exist.

In FIG. 6, a step S11 loads a partial image P(1) by setting i to i=1, and a step S12 extracts feature points on the partial image P(i). In other words, the MPU 13 reads the partial image P(1) from the image memory 14, and automatically detects the feature points on the partial image P(1). If the partial image P(1) is as shown in FIG. 7A, it is desirable to extract corner portions 21 through 24 of the partial image P(1) indicated by circular marks as the feature points. Such feature points can be detected by use of a differentiating filter or the like.

Next, a step S13 loads a partial image P(i+1) which is adjacent to the partial image P(i), and a step S14 extracts feature points on the partial image P(i+1) corresponding to the feature points on the partial image P(i). More particularly, the MPU 13 reads the partial image P(2) which is adjacent to the partial image P(1) from the image memory 14, and extracts feature points 21' through 24' of the partial image P(2) which respectively correspond to the feature points 21 through 24 of the partial image P(1) and are indicated by circular marks in FIG. 7B. The corresponding feature points 21' through 24' can be extracted by obtaining correlation values (correlation values between the partial image P(1) and P(2)) of small image regions about the feature points 21 through 24 on the partial image P(1) on the partial image P(2), and extracting as the corresponding feature points 21' through 24' the centers of the regions where the correlation values become a local maximum.

A step S15 calculates projection conversion parameters. If a coordinate of a certain point on the partial image P(1) is denoted by (x, y) and a corresponding coordinate on the corresponding partial image P(2) is denoted by (x', y'), the following formulas (1) stand when the target object is a plane such as the paper surface or the wall or a distant object, where h0 through h7 are called projection conversion parameters which are constants peculiar between two images.

$$x = (h0 \cdot x' + h1 \cdot y' + h2)/(h6 \cdot x' + h7 \cdot y' + 1)$$

$$y = (h3 \cdot x' + h4 \cdot y' + h5)/(h6 \cdot x' + h7 \cdot y' + 1) \quad (1)$$

Accordingly, the projection conversion parameters h0 through h7 can be obtained if four or more pairs of corresponding feature points of the partial images P(1) and P(2) exist. In general, several tens of pairs of corresponding feature points of the partial images P(1) and P(2) are used since noise is included in the images, and the MPU 13 calculates the projection conversion parameters h0 through h7 from the pairs of corresponding feature points by the method of least squares.

A step S16 combines the partial images P(i) and P(i+1) into a single image based on the calculated projection conversion parameters h0 through h7, using the formulas (1) described above, and newly defines the single image as P(i+1). In this particular case, the MPU 13 generates a single image by combining the partial images P(1) and P(2) based on the relationships of the feature points 21 through 24 of the partial image P(1) and the corresponding feature points 21' through 24' of the partial image P(2), that is, the projection conversion parameters h0 through h7, using the formulas (1). Hence, the single image shown in FIG. 7C is generated when the partial images P(1) and P(2) respectively shown in FIGS. 7A and 7B are combined.

Therefore, when the projection conversion parameters h0 through h7 are calculated, the MPU 13 uses the formulas (1) to calculate the positions of all of the pixels of the partial image P(2) on the partial image P(1). Hence, the partial images P(1) and P(2) can be appropriately combined into the single image which is newly defined as P(2).

A step S17 increments i by one to i=i+1, and a step S18 decides whether or not i=N. The process returns to the step S12 if the decision result in the step S18 is NO. The process ends if the decision result in the step S18 is YES.

Hence, the MPU 13 repeats the above described operation until all of the partial images are combined into the single image. As a result, it is possible to generate a high-definition image.

Of course, it is not essential for the image combining operation to be carried out in the image pickup apparatus. The partial images may be transferred to an information processing apparatus such as a personal computer, so that the image combining operation is carried out in the personal computer.

In addition, if a distortion is introduced in the generated high-definition image, it is possible to correct the distortion manually or by use of the projection conversion parameters.

Next, a description will be given of the operation of this first embodiment in the partial image pickup mode, by referring to FIGS. 8A through 8E and 9. FIG. 8A through 8E are diagrams for explaining the partial images which are picked up by this first embodiment. In addition, FIG. 9 is a flow chart for explaining the operation of this first embodiment in the partial image pickup mode, that is, the partial image pickup operation of the step S2 shown in FIG. 5.

First, the full image of the object shown in FIG. 8A is picked up by use of the field angle setting unit 16, the lens 10, the image pickup element 11, the A/D converter 12, the MPU 13 and the display unit 15. In this state, the field angle with which the image pickup is made is set by the field angle setting unit 16 so that the full image of the object can be picked up.

Next, in order to pickup a partial image corresponding to a divided image shown in FIG. 8B which is obtained by dividing the full image of the object, the MPU 13 displays on the display unit 15 at the time of the monitoring a divided image indicated by a dotted line and a through-image indicated by a solid line in an overlapping manner as shown in FIG. 8D, so as to input a partial image similar to the divided image shown in FIG. 8B. Similarly, in order to pickup a partial image corresponding to a divided image shown in FIG. 5C which is obtained by dividing the full image of the object, the MPU 13 displays on the display unit 15 at the time of the monitoring a divided image indicated by a dotted line and a through-image indicated by a solid line in an overlapping manner as shown in FIG. 8E, so as to input a partial image similar to the divided image shown in FIG. 8C.

Figure 9:
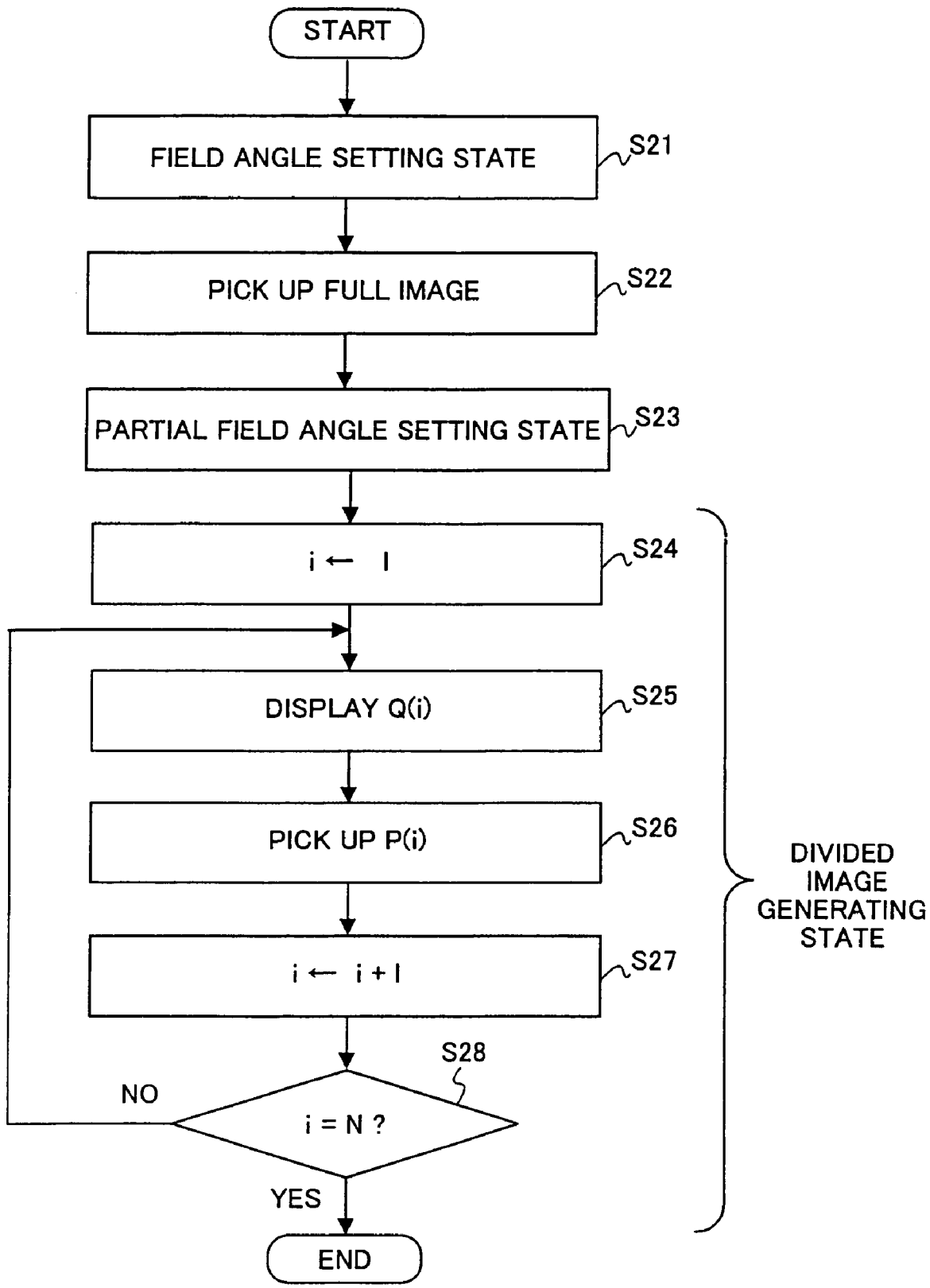
FIG. 9 is a flow chart for explaining the operation of the first embodiment of the image pickup apparatus in a partial image pickup mode.

In FIG. 9, a step S21 sets the image pickup apparatus to a full field angle setting state to set the field angle for picking up the full image of the target object. In this full field angle setting state, the operator operates the field angle setting unit 16 so as to determine the field angle for picking up the full image of the target object. Then, a step S22 picks up the full image of the target object. More particularly, the operator pushes the release button 19, so that the image pickup apparatus escapes from the full field angle setting state. The full image of the target object is picked up by the image pickup element 11 via the lens 10, and the image signal from the image pickup element 11 is supplied to the MPU 13 via the A/D converter 12. Hence, the digital image signal is subjected to various processes such as the correction process and the compression process in the MPU 13, and the processed digital image signal is stored in the image memory 14.

Next, a step S23 sets the image pickup apparatus to a partial field angle setting state to set the field angle for picking up the partial image of the target object. In this partial field angle setting state of the image pickup apparatus, the operator operates the field angle setting unit 16 so as to determine the field angle for picking up the partial image of the target object. In this embodiment, the image pickup apparatus assumes a divided image generating state when the end of the setting of the partial field angle is notified from the field angle setting unit 16 to the MPU 13. The end of the setting of the partial field angle may be notified by operating the interface 18 or, by issuing an end notification if no operation is carried out to change the field angle for a predetermined time. Thereafter, it is possible to take measures so that the image pickup apparatus returns to the partial field angle setting state if the field angle is changed again.

In the divided image generating state, the MPU 13 carries out an operation to divide the full image stored in the image memory 14, by steps S24 through S28 shown in FIG. 9. The step S24 sets i to i=1, and the step S25 displays a divided image Q(i). The step S26 picks up a partial image P(i). The step S27 increments i to i=i+1, and the step S28 decides whether or not i=N. The process returns to the step S25 if the decision result in the step S28 is NO. The process ends if the decision result in the step S28 is YES. The steps S24 through S28 carried out in the divided image generating state will be described later in more detail.

Figure 10A:
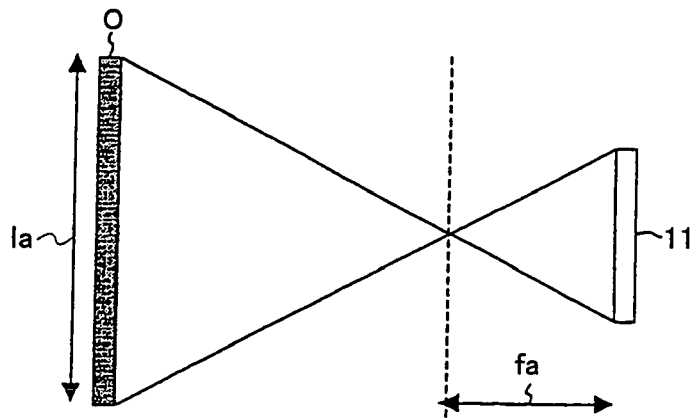
FIGS. 10A and 10B are diagrams for explaining a division of a full image in the first embodiment of the image pickup apparatus.
Figure 10B:
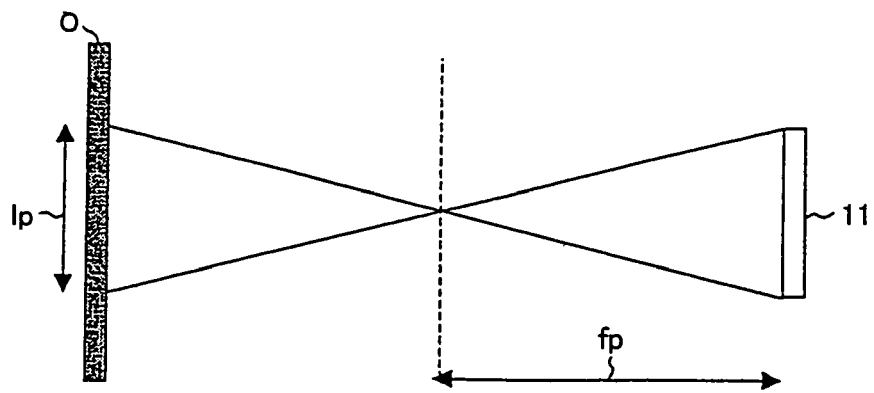
Figure 11:
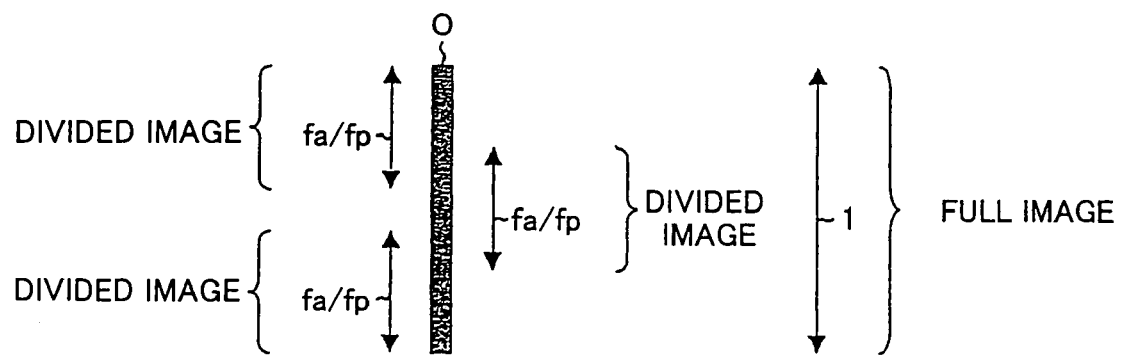
FIG. 11 is a diagram for explaining the division of the full image in the first embodiment of the image pickup apparatus.

A description will be given of the division of the full image. FIGS. 10A, 10B and 11 are diagrams for explaining the division of the full image in this first embodiment.

As shown in FIG. 10A, when the full image of a target object O is picked up, the full image is imaged on the image pickup element 11 in a range 11. In this state, it is assumed for the sake of convenience that the lens 10 has a focal distance fa. On the other hand, when the partial field angle is set in the field angle setting unit 16 in the partial field angle setting state as shown in FIG. 10B, the partial image is imaged on the image pickup element 11 in a range lp. In this state, it is assumed for the sake of convenience that the lens 10 has a focal distance fp.

A ratio of the length of the partial image with respect to the length of the full image can be described by lp/la=fa/fp. Accordingly, when the length of the full image is denoted by l as shown in FIG. 11, the length of the divided image becomes fa/fp. The number of divided images is determined so that each divided image has an overlapping region. If a minimum required length of the overlapping region is denoted by dl, a number mx of divisions of the image in the horizontal direction is determined as an integer which makes the following formula (2) greater than or equal to one and a positive integer closest to one.

$$(mx-1)\{(fa/fp)-d\}+(fa/fp) \qquad (2)$$

In this state, the minimum required length d1 is used for d. If a number mx which makes the formula (2) exactly equal to one does not exist, d is treated as an unknown after determining the number mx, and d2 is used for d so that the formula (2) becomes equal to one. In this case, d2 becomes greater than d1, and the overlapping region increases. Although the number mx of divisions in the horizontal direction of the image is determined in the above described case, a number my of divisions in the vertical direction of the image is generally the same as the number mx. However, if the minimum required length of the overlapping region differs between the horizontal divisions and the vertical divisions, the number my is obtained by carrying out a calculation similar to that carried out to obtain the number mx, but by use of the minimum required length of the overlapping region for the vertical division. Therefore, the number of divisions of the full image amounts to a total of mx×my.

In the divided image generating state, the MPU 13 reads the full image from the image memory 14, and divides the full image so that the divided images partially overlap. As a result, N=mx×my divided images Q(i) are generated, where i=1, 2, ..., N. Next, the MPU 13 displays the divided image Q(i) on the display unit 15, and urges the operator to pick up an image similar to the divided image Q(i). In this state, the MPU 13 may carry out an appropriate interpolation process on the divided image Q(i), so as to make an enlarged display of the divided image Q(i) with an appropriate magnification of fp/fa, for example. A constant value which is obtained through experience may be used for the minimum required length d1 or, the value of the minimum required length d1 may be varied depending on the kind of image.

The operator carries out an operation to pick up and record a part of the target object which approximately matches the divided image Q(i), while viewing the divided image Q(i) on the display unit 15. If the minimum required overlapping region is set with a sufficient margin, a slight error between the picked up partial image P(1) and the divided image Q(i) will not cause problems. By this operation carried out by the operator, the partial image P(1) is picked up in the above described manner by use of the lens 10, the image pickup element 11, the A/D converter 12, the MPU 13 and the display unit 15, and is recorded in the image memory 14. The above described operation is successively carried out with respect to all of the N divided images, and thus, the partial images P(1) through P(N) are successively picked up and recorded in the image memory 14. Each of the above states, that is, the image number of each partial image which is picked up, may be notified to the operator using the interface 18, by indicating the image number of the partial image which is being picked up. In addition, all of the divided images may be generated immediately after the full image is picked up or, may be generated immediately before being displayed for picking up the partial image. Furthermore, it is possible to provide a means for displaying a position of each divided image on the full image.

Therefore, this first embodiment of the image pickup apparatus includes the field angle setting unit 16 which functions as the field angle setting means for setting the field angle with which the image is to be picked up, and the display unit 15 which functions as the display means for displaying the image, and the target object is picked up as the partial images which are obtained by dividing the target object into a plurality of divisions with a predetermined overlap quantity. The image pickup apparatus further includes the MPU 13 which functions as a means for generating the partial image displayed on the display unit 15 by dividing the full image of the picked up target object into predetermined sizes by setting the field angle to a predetermined field angle by the field angle setting unit 16, using the field angle and overlap information of the partial images after the field angle setting unit 16 sets the field angle, so that the high-definition image can be generated by combining the partial images of the target object. Hence, the necessary overlapping region can be secured when combining the partial images, and it is possible to instruct the operator of the parts of the target object to be picked up so that all parts of the target object are picked up. In addition, by displaying the divided image which closely resembles the partial image which is to be picked up and urging the operator to pick up a similar image (partial image), it is possible to automatically secure the necessary overlap quantity for combining the partial images, without requiring the operator to be aware of such, and all parts of the target object are positively picked up without a dropout. Accordingly, compared to the conventional methods, it is possible to reduce the burden on the operator, and the required amount of processing can be suppressed to a realistic or tolerable amount executable within a camera.

In this first embodiment, the overlapping region of each divided image has the predetermined length, but this predetermined length may of course be freely varied when the operator makes the image pickup.

Next, a description will be given of a second embodiment of the image pickup apparatus according to the present invention. In this second and subsequent embodiments of the image pickup apparatus, the basic structure of the first embodiment of the image pickup apparatus shown in FIG. 4 may be used, and thus, a description of the basic structure will be omitted for these embodiments. In addition, the second and subsequent embodiments of the image pickup apparatus respectively employ second and subsequent embodiments of the image processing method according to the present invention.

In this second embodiment, the operator can freely vary the length of the overlapping region of each divided image in the first embodiment described above. More particularly, when a manipulating button within the interface 18 is pushed, the MPU 13 displays a menu shown in FIG. 12A on the display unit 15. When a "overlap quantity" on the menu is specified by the manipulation button within the interface 18, the MPU 13 changes the length of the overlapping region of each divided image to a desired overlap quantity which is prestored or specified.

According to this second embodiment, the manipulation button within the interface 18 functions as an overlap quantity specifying means for specifying the amount of overlap of the partial images. Hence, it is possible to pick up the partial images so as to improve the accuracy of combining the partial images while taking into consideration the available storage capacity. Each partial image must have an overlapping region to a certain extent, regardless of the target object. Moreover, depending on the target object, a success rate of the subsequent partial image combining process deteriorates unless the overlapping region is increased. In the conventional methods, the amount of overlapping region to be secured depends solely on the skill and experience of the operator. But in this second embodiment, the predetermined overlapping region can accurately be secured automatically, and the overlap quantity can be set arbitrarily to secure the desired overlap quantity and to further improve the effects of the overlapping region.

In the first and second embodiments described above, the field angle with which the partial image is picked up is set manually by the operator. However, the field angle with which the partial image is picked up may be set automatically to a predetermined field angle.

Next, a description will be given of a third embodiment of the image pickup apparatus according to the present invention. In this third embodiment, the field angle with which the partial image is picked up is set automatically to a predetermined field angle in the first embodiment described above.

More particularly, when a manipulating button within the interface 18 is pushed, the MPU 13 displays a menu shown in FIG. 12B on the display unit 15. When a "focal distance" on the menu is specified by the manipulation button within the interface 18, the MPU 13 changes the focal distance of the lens 10 to a desired focal distance which is prestored or specified. In the field angle setting state, the MPU 13 controls the zoom mechanism 17 so that the focal distance of the lens 10 becomes 100 mm, for example, so as to automatically set the field angle to the predetermined field angle, and the changes the image pickup apparatus to the next state.

Next, a description will be given of a fourth embodiment of the image pickup apparatus according to the present invention. In this fourth embodiment, the field angle with which the partial image is picked up is set automatically to a predetermined field angle in the second embodiment described above, in a manner similar to that of the third embodiment.

Therefore, according to the third and fourth embodiments, it is possible to easily set the field angle with which the partial image is to be picked up in the first and second embodiments described above, respectively, because the MPU 13 functions as a means for automatically setting the field angle with which the partial image is to be picked up to a predetermined field angle. In addition, although the field angle used to pick up the partial image differs depending on the individual operator, it is possible to set the field angle arbitrarily. For this reason, it is possible to further reduce the burden on the operator, by automatically setting the field angle when picking up the image of the target object in divisions.

In the third and fourth embodiments described above, the focal distance of the lens 10 is set directly in order to set field angle. However, it is possible to set the field angle by setting the resolution with which the image pickup is to be made.

Next, a description will be given of a fifth embodiment of the image pickup apparatus according to the present invention. In this fifth embodiment, the field angle with which the partial image is picked up is set automatically to a predetermined field angle in the third embodiment described above, by setting the resolution with which the partial image is to be picked up.

More particularly, when a manipulating button within the interface 18 is pushed, the MPU 13 displays a menu shown in FIG. 12C on the display unit 15. When a "resolution" on the menu is specified by the manipulation button within the interface 18, the MPU 13 changes the resolution to a desired resolution which is prestored or specified. The resolution is set to 200 dpi, for example.

The "focal distance" displayed on the menu shown in FIG. 12C may be switched automatically to read "automatic" when the value of the "resolution" is input, and other items displayed on the menu may similarly be switched automatically. The distance sensor 20 functions as a distance measuring means for measuring the distance to the target object. The MPU 13 uses a distance l to the target object measured by the distance sensor 20 and a resolution r which is specified by the manipulating button within the interface 18, to calculate the focal distance fp with which the partial image is to be picked up based on the following formula (3), where e denotes a pixel pitch of the image pickup element 11.

$$fp = (r \cdot l)/e \quad (3)$$

The MPU 13 controls the zoom mechanism 17 by the focal distance fp which is calculated according to the formula (3), so as to set the field angle. Of course, it is possible to use a known distance sensor which is used for automatic focusing in common as the distance sensor 20.

Next, a description will be given of a sixth embodiment of the image pickup apparatus according to the present invention. In this sixth embodiment, the field angle with which the partial image is picked up is set automatically to a predetermined field angle in the fourth embodiment described above, by setting the resolution with which the partial image is to be picked up.

More particularly, when a manipulating button within the interface 18 is pushed, the MPU 13 displays a menu similar to that shown in FIG. 12C on the display unit 15. When a "resolution" on the menu is specified by the manipulation button within the interface 18, the MPU 13 changes the resolution to a desired resolution which is prestored or specified.

According to the fifth and sixth embodiments, the manipulating button within the interface 18 functions as a resolution specifying means for specifying the resolution, and the distance sensor 20 functions as the distance measuring means for measuring the distance to the target object. In addition, the MPU 13 functions as a means for setting the field angle to a predetermined value by calculating the field angle from the resolution specified by the resolution specifying means and the distance measured by the distance measuring means. Consequently, it is possible to easily specify the field angle with which the partial image is to be picked up. Although the resolution to be used differs depending on the target object which is to be picked up by the image pickup apparatus, it is possible to arbitrarily set the resolution, thereby making it possible to further reduce the burden on the operator.

Next, a description will be given of a seventh embodiment of the image pickup apparatus according to the present invention. In this seventh embodiment, the size of the target object is set in addition to the resolution in the fifth embodiment described above, without the use of the distance sensor 20.

More particularly, when a manipulating button within the interface 18 is pushed, the MPU 13 displays a menu shown in FIG. 12D on the display unit 15. When the "resolution" and a "target object size" on the menu are specified by one or more manipulation buttons within the interface 18, the MPU 13 changes the resolution to a desired resolution which is prestored or specified, and also changes the target object size to a desired size. For example, the resolution is set to 200 dpi, and the target object size is set to A4-size horizontal or B5-size vertical. The target object size may be specified by the manipulation button within the interface 18 to a standardized paper size or, the size itself such as the length may be input directly.

In this seventh embodiment, the MPU 13 calculates the focal distance fp for picking up the partial image based on the following formula (4), using the length la of the target object determined by the target object size which is input via the manipulating button within the interface 18 and the set resolution r, where g denotes a number of pixels of the image pickup element 11 along a direction corresponding to the target object length la. The MPU 13 sets the field angle by controlling the zoom mechanism 17 based on the focal distance fp which is calculated according to the formula (4).

$$fp = (r \cdot fa \cdot la)/g \quad (4)$$

Next, a description will be given of an eighth embodiment of the image pickup apparatus according to the present invention. In this eighth embodiment, the size of the target object is set in addition to the resolution in the sixth embodiment described above, similarly to the seventh embodiment, without the use of the distance sensor 20.

Therefore, according to the seventh and eighth embodiments, the manipulating button within the interface 18 functions as a target object size specifying means for specifying the size of the target object, and the manipulating button within the interface 18 functions as a resolution setting means for setting the resolution by specifying or storing the resolution. In addition, the MPU 13 functions as a means for setting the field angle to a predetermined value by calculating the field angle from the target object size specified by the target object size specifying means and the resolution specified by the resolution specifying means. Consequently, it is possible to easily specify the field angle with which the partial image is to be picked up. In addition, since it is possible to set the size of the target object and it is thus unnecessary to provide the distance sensor 20, it is possible to reduce both the size and cost of the image pickup apparatus.

Next, a description will be given of a ninth embodiment of the image pickup apparatus according to the present invention. In this ninth embodiment, the number of divisions of the target object is set in the fifth embodiment described above.

More particularly, when a manipulating button within the interface 18 is pushed, the MPU 13 displays a menu shown in FIG. 12E on the display unit 15. When a "number of divisions" on the menu is specified by the manipulation button within the interface 18, the MPU 13 sets the number of divisions to a desired number of divisions. For example, the number of divisions is set to three. The number of divisions in one direction is set in this ninth embodiment. Hence, the actual number of divisions is 3×3=9. Of course, the number of divisions may be specified to the total number of partial images.

The MPU 13 calculates the focal distance fp with which the partial image is to be picked up, by solving the formula (5) using the number mx of divisions of the target object in one direction specified by the manipulating button within the interface 18. In addition, the MPU 13 sets the field angle by controlling the zoom mechanism 17 based on the focal distance fp which is calculated according to the formula (5).

$$(mx-1)\{(fa/fp)-d1\}+(fa/fp)=1 \tag{5}$$

Next, a description will be given of a tenth embodiment of the image pickup apparatus according to the present invention. In this tenth embodiment, the number of divisions of the target object is set in the sixth embodiment described above, similarly to the ninth embodiment.

Therefore, according to the ninth and tenth embodiments, it is possible to easily specify the field angle with which the partial image is to be picked up in the fifth and sixth embodiments, respectively, by providing in the image pickup apparatus the manipulating button within the interface 18 having the function of a division number specifying means for specifying the number of divisions of the full image of the target object, and the MPU 13 which functions as a means for setting the field angle to a predetermined field angle by calculating the field angle from the number of divisions specified by the division number specifying means. The time required to pick up the full image of the target object increases and the storage capacity required to store the partial images increases as the number of partial images increases. However, by setting the number of partial images to be recorded, it is possible to prevent such problems in advance by predicting the time required to pick up the full image and the storage capacity required to store the partial images.

It is desirable that each setting made in the second through tenth embodiments described above occurs prior to the partial image pickup mode. In addition, when a certain item is set on the menu which is displayed on the display unit 15, an item which is automatically determined thereby or cannot be decided may be indicated as being "invalid", for example.

Figure 13:
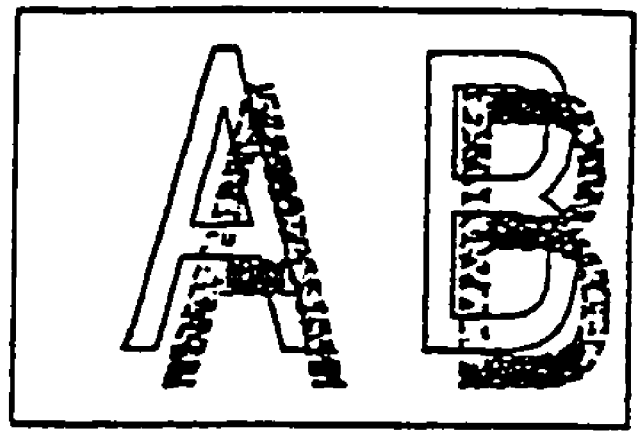
FIG. 13 is a diagram showing a display made in the first through tenth embodiments of the image pickup apparatus according to the present invention.

According to the first through tenth embodiments described above, the MPU 13 displays on the display unit 15 a divided image indicated by a dotted line and a through-image indicated by a solid line in an overlapping manner as shown in FIG. 13. In this state, the divided image is displayed on an enlarged scale which is fp/fa times, as described above. The operator picks up the image of the target object by varying the position and direction of the image pickup apparatus (camera) so that the divided image and the through-image match as much as possible. By repeating such an operation, it is possible to pick up the partial images without missing image portions of the target object, with appropriate overlapping regions among the partial images without having the operator be positively aware of forming such overlapping regions. The divided image may be subjected to an image processing such as an edge emphasis process, so that it is easier to match the positions of the divided image and the through-image. Further, the tone value of one of the through-image and the divided image may be reduced or, one of the through-image and the divided image may be displayed in black-and-white, so as to facilitate the operator distinguish the through-image and the divided image.

Moreover, according to the first through tenth embodiments, the display unit 15 functions as the display means for simultaneously displaying the divided image and the image which is presently being picked up in an overlapping manner. Hence, it is possible to facilitate the recognition of the divided image by the operator when picking up the partial image. In the conventional methods, the through-image and the divided image are displayed to only partially overlap or, the through-image is displayed to partially overlap another adjacent image, thereby making it difficult to recognize and position the images. But in the first through tenth embodiments, the two images which are displayed in the overlapping manner in the full image are approximately the same, so that the effect of positioning or aligning the two images by the overlapping display is large.

Figure 14:
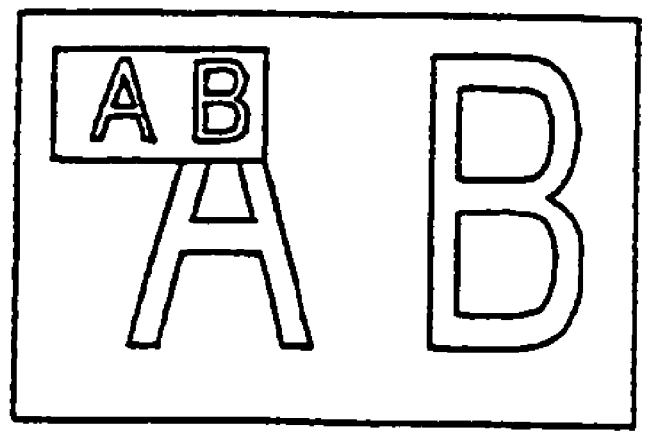
FIG. 14 is a diagram showing a display made in an eleventh embodiment of the image pickup apparatus according to the present invention.

Next, a description will be given of an eleventh embodiment of the image pickup apparatus according to the present invention. In this eleventh embodiment, the MPU 13 displays the through-image on the display unit 15 on a large scale as shown in FIG. 14, and displays the divided image on an appropriately enlarged or reduced scale in a part of the display made on the display unit 15, in the first embodiment described above. FIG. 14 shows a case where the divided image is displayed on a reduced scale at a top left part of the display made on the display unit 15. The operator picks up the image while comparing the scaled divided image and the through-image on the display and varying the camera position and direction so that the two images become approximately the same. By repeating such an operation, it is possible to pick up the partial images which automatically overlap without drop-out of image information related to the target object.

Next, a description will be given of a modification of the eleventh embodiment of the image pickup apparatus. In this modification of the eleventh embodiment, the MPU 13 displays the through-image on the display unit 15 on a large scale, and displays the divided image on an appropriately enlarged or reduced scale in a part of the display made on the display unit 15, similarly to the eleventh embodiment, in the any of the second through tenth embodiments described above.

In the eleventh embodiment and the modification thereof, the divided image may be displayed on the display unit 15 on a large scale and the through-image may be displayed in a part of the display made on the display unit 15, or alternatively, the divided image and the through-image may be displayed side-by-side on the display unit 15. Furthermore, the divided image and the through-image may be displayed on corresponding display units by providing two display units.

Therefore, according to the eleventh embodiment and the modification thereof, the image pickup apparatus according to any of the first through tenth embodiments simultaneously displays the divided image and the image which is presently being picked up at different positions on the display unit 15 which functions as a display means. For this reason, the operator can easily recognize the divided image when picking up the partial image. The display unit 15 provided on the image pickup apparatus is often small and the display made thereon is difficult to see, particularly when two images are simultaneously displayed thereon. In the conventional methods, the images that are compared only are the same in part, and if two images are simultaneously displayed separately, it is extremely difficult to visually recognize the end portions which are the same, thereby increasing the possibility of making errors during the image pickup-operation. But in the eleventh embodiment and the modification thereof, the two images that are compared are approximately the same, and the two images are compared in the full image. Consequently, the visual recognition does not greatly deteriorate even if two images are simultaneously displayed, thereby preventing the operator from making errors during the image pickup operation.

Next, a description will be given of a twelfth embodiment of the image pickup apparatus according to the present invention. In this twelfth embodiment, the MPU 13 displays the divided image and the through-image time-divisionally at predetermined time intervals at the same position on the display unit 15, in the first embodiment described above. The operator picks up the image while comparing the divided image and the through-image which are time-divisionally displayed and varying the camera position and direction so that the two images become approximately the same. By repeating such an operation, it is possible to pick up the partial images which automatically overlap without dropout of image information related to the target object.

Next, a description will be given of a modification of the twelfth embodiment of the image pickup apparatus. In this modification of the twelfth embodiment, the MPU 13 displays the divided image and the through-image time-divisionally at predetermined time intervals at the same position on the display unit 15, similarly to the twelfth embodiment, in any of the second through tenth embodiments described above.

In the twelfth embodiment and the modification thereof, it is possible to add an indication to at least one of the divided image and the through-image, so that it is possible to positively distinguish the two images. For example, the MPU 13 may display an indication which indicates the kind of image on the lower part of each of the divided image and through-image or, turn ON the LEDs 106 and 107 corresponding to the respective images.

Therefore, according to the twelfth embodiment and the modification thereof, the image pickup apparatus according to any one of the first through tenth embodiments displays the divided image and the through-image time-divisionally at predetermined time intervals at the same position on the display unit 15 which functions as a display means, and thus, it is possible to facilitate the recognition of the divided image by the operator when picking up the partial image. The display unit 15 provided on the image pickup apparatus is often small and the display made thereon is difficult to see and recognize. In the conventional methods, the images that are compared only are the same in part, and if two images are time-divisionally displayed, it is extremely difficult to visually recognize the end portions which are the same, thereby increasing the possibility of making errors during the image pickup operation. But in the twelfth embodiment and the modification thereof, the two images that are compared are approximately the same, and the two images are compared in the full image. Consequently, the visual recognition does not greatly deteriorate even if two images are time-divisionally displayed, thereby preventing the operator from making errors during the image pickup operation.

Next, a description will be given of a thirteenth embodiment of the image pickup apparatus according to the present invention. In this thirteenth embodiment, an image switching unit within the interface 18 arbitrarily switches the display on the display unit 15 via the MPU 13 between the divided image and the through-image, in response to an operation carried out by the operator on the image switching unit, in the first embodiment described above. The operator picks up the image while comparing the divided image and the through-image which are arbitrarily switched and displayed and varying the camera position and direction so that the two images become approximately the same. By repeating such an operation, it is possible to pick up the partial images which automatically overlap without dropout of image information related to the target object.

Next, a description will be given of a modification of the thirteenth embodiment of the image pickup apparatus. In this modification of the thirteenth embodiment, the image switching unit within the interface 18 arbitrarily switches the display on the display unit 15 via the MPU 13 between the divided image and the through-image, in response to the operation carried out by the operator on the image switching unit, similarly to the thirteenth embodiment, in any of the second through tenth embodiments described above.

In the thirteenth embodiment and the modification thereof, it is possible to add an indication to at least one of the divided image and the through-image, so that it is possible to positively distinguish the two images. For example, the MPU 13 may display an indication which indicates the kind of image on the lower part of each of the divided image and through-image or, turn ON the LEDs 106 and 107 corresponding to the respective images.

According to the thirteenth embodiment and the modification thereof, the image pickup apparatus according to any of the first through tenth embodiments includes the image switching unit within the interface 18, which functions as an image switching means for switching the display on the display unit 15 which functions as a display means, to one of the divided image and the image which is presently being picked up. Hence, the operator can easily recognize the divided image when picking up the partial images. In addition, the number of features included in the target object may be small depending on the target object, and in such cases, it is desirable to confirm the divided image. This thirteenth embodiment and the modification thereof can easily confirm the divided image at an arbitrary timing by switching the display to the divided image by the image switching unit within the interface 18, so that it is possible to prevent the operator from making errors during the image pickup operation.

Each of the first through thirteenth embodiments and the modifications described above is provided with a divided image displaying function for displaying the divided image when picking up the partial image. However, it is of course possible to provide two or more such divided image displaying functions, so that the operator may select one of the divided image displaying functions.

Next, a description will be given of a fourteenth embodiment image pickup apparatus according to the present invention. In this fourteenth embodiment of the image pickup apparatus, the operator can select the order with which the partial images are picked up, in the first embodiment described above.

Figure 15:
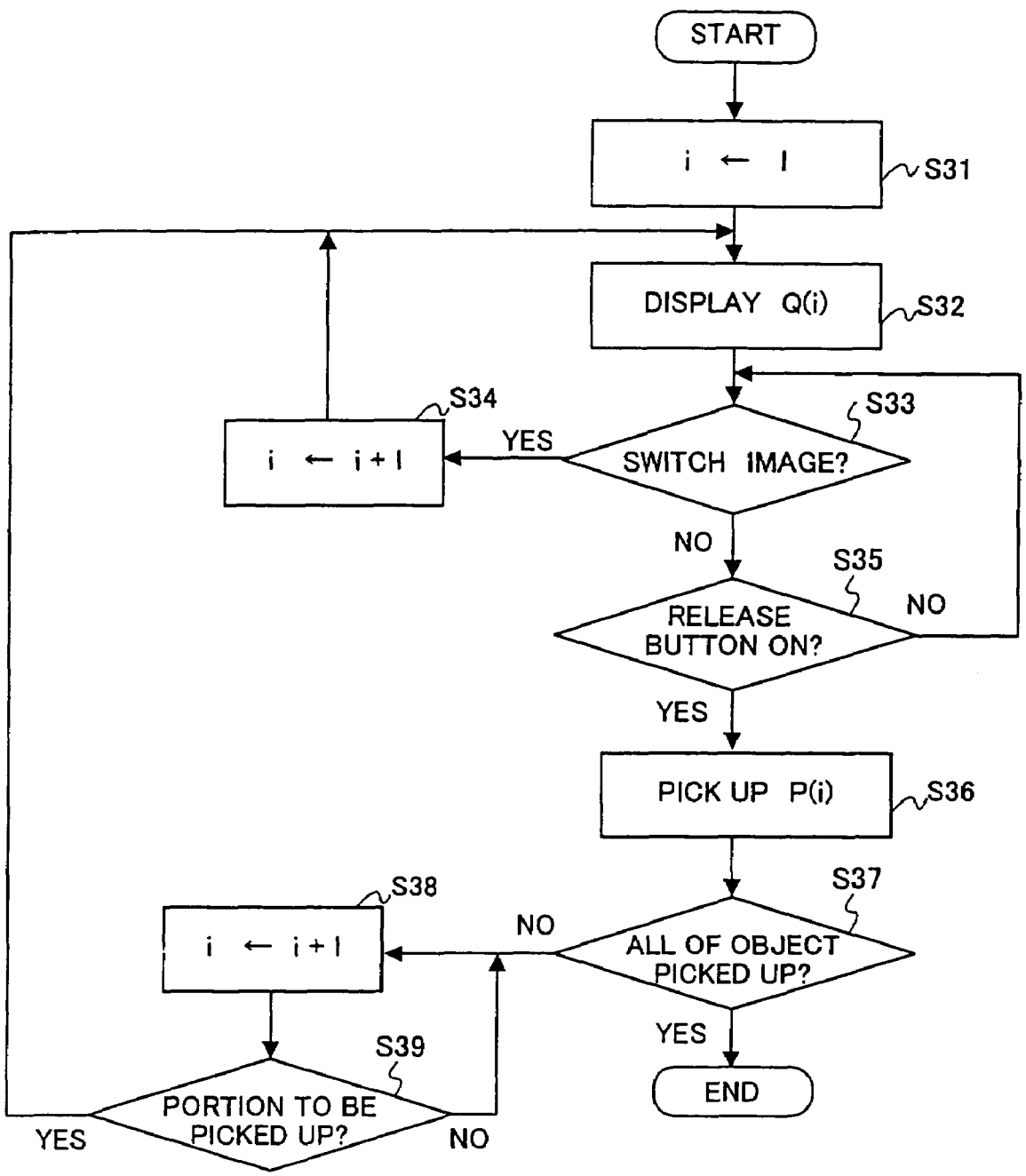
FIG. 15 is a flow chart for explaining the operation of a fourteenth embodiment of the image pickup apparatus according to the present invention.

FIG. 15 is a flow chart for explaining the operation of this fourteenth embodiment of the image pickup apparatus. The operation shown in FIG. 15 is basically the same as that shown in FIG. 9 up to the divided image generating state. In addition, when the image switching unit within the interface 18 is operated by the operator, the display of the divided image Q(i) is successively switched.

In FIG. 15, a step S31 sets i to i=1, and a step S32 displays the divided image Q(i). A step S33 decides whether or not the image switching unit within the interface 18 is operated to switch the display of the image. If the decision result in the step S33 is YES, a step S34 increments i to i=i+1, and the process returns to the step S32. On the other hand, if the decision result in the step S33 is NO, a step S35 decides whether or not the release button 19 is turned ON (or pushed). The process returns to the step S33 if the decision result in the step S35 is NO.

If the decision result in the step S35 is YES, a step S36 picks up the partial image P(i), and a step S37 decides whether or not the image of all of the target object is picked up without dropout of image information. If the decision result in the step S37 is NO, a step S38 increments i to i=i+1, and a step S39 decides whether or not a portion of the image of the target object is to be picked up since the portion is not yet picked up. The process returns to the step S38 if the decision result in the step S39 is NO, and the process returns to the step S32 if the decision result in the step S39 is YES. Further, the process ends if the decision result in the step S37 is YES.

In other words, if the partial image is already picked up and the corresponding divided image is displayed on the display unit 15, it is desirable that the MPU 13 makes an indication on the display unit 15 or by the LED 106 that the partial image is recorded with respect to the divided image. When the release button 19 is pushed in a state where a desired divided image is displayed on the display unit 15, the partial image P(i) is picked up by use of the lens 10, the image pickup element 11, the A/D converter 12, the MPU 13 and the display unit 15, and the image signal of the picked up image is recorded in the image memory 14.

In addition, the MPU 13 sets a flag which indicates whether or not the partial image P(i) corresponding to the divided image Q(i) is picked up, that is, input or recorded, with respect to each divided image. The MPU 13 uses this flag to display on the display unit 15 the divided image corresponding to the partial image which is not yet recorded. Such an operation is repeated until the partial images corresponding to all of the divided images are input or recorded.

Next, a description will be given of a modification of the fourteenth embodiment of the image pickup apparatus. In this modification of the fourteenth embodiment, the operator can select the order with which the partial images are picked up, in the any of the second through thirteenth embodiments described above.

Of course, in this modification of the fourteenth embodiment, it is possible to display only the divided image corresponding to the unrecorded partial image, even when successively switching the display of the divided image by the image switching unit. In addition, when the image pickup of the partial image ends and the next divided image is to be displayed, the display of this next divided image may be successively regardless of whether or not the corresponding partial image is picked up. In this case, if the partial image is already picked up and the corresponding divided image is displayed, it is desirable to make an indication with respect to this divided image by the display unit 15 or the LED 106 to indicate that the partial image corresponding to this divided image is already recorded. Furthermore, even if the partial image is already recorded, it is desirable that an overwrite of the partial image is possible.

Therefore, according to this modification of the fourteenth embodiment, the image switching unit functions as a partial image selecting means for selecting the divided image. Hence, it is possible to easily pickup the partial image again if the image pickup of the partial image fails. In the case of an image pickup error due to unwanted hand motion, it is desirable to pick up the partial image over again. In addition, since it takes time to pickup the image of the target object in divisions, there is a demand to pickup a changing portion within the target object at an appropriate timing. Accordingly, the flexibility of picking up the partial image is improved by making it possible to arbitrarily select the divided image.

Next, a description will be given of a fifteenth embodiment of the image pickup apparatus according to the present invention. In this fifteenth embodiment of the image pickup apparatus, it is possible to switch the mode to the normal image pickup mode from any state of the partial image pickup mode, in the first embodiment described above.

In this fifteenth embodiment, the MPU 13 interrupts the present partial image pickup mode in response to the switching of the mode to the normal image pickup mode by the switch 102 within the interface 18. The MPU 13 stores the content (state) at the time when this interruption takes place in a memory such as the image memory 14, before actually switching the mode to the normal image pickup mode. When the mode switching unit 19 is operated again to switch the mode to the partial image pickup mode, the MPU 13 restores the stored content within the memory to restore the state at the time when the partial image pickup mode was interrupted, and continues the partial image pickup mode from that time on.

Next, a description will be given of a modification of the fifteenth embodiment of the image pickup apparatus. In this modification of the fifteenth embodiment, it is possible to switch the mode to the normal image pickup mode from any state of the partial image pickup mode, in any of the second through fourteenth embodiments described above.

In this modification of the fifteenth embodiment, the image pickup apparatus according to any of the second through fourteenth embodiments includes the MPU 13 and the mode switching unit 19 which functions as an image pickup interrupting means for interrupting the image pickup of the partial image and returning the image pickup apparatus to a predetermined state. Hence, it is possible to eliminate an unnecessary image pickup time which would otherwise be required to pick up the partial image again when the image pickup of the target object in divisions is interrupted. The image pickup of the target object in divisions takes time, and for this reason, the operator may miss the right timing when a normal image pickup is desired. Moreover, if the image pickup of the target object in divisions is interrupted to carry out a normal image pickup and the image pickup in divisions is thereafter restarted all over again from the start, it is extremely troublesome to carry out such an operation and the burden on the operator is extremely large. But according to this modification of the fifteenth embodiment, it is possible to minimize the unnecessary increase of the image pickup time and to reduce the burden on the operator, by making it possible to continue the image pickup of the target object in divisions even after interruption thereof.

In each of the first through fifteenth embodiments and the modifications, it is possible to omit the field angle setting unit 16, if the operator can move close to and/or mode away from the target object to realize the effects equivalent to those of the field angle setting unit 16. In this case, the operator moves the position of the image pickup apparatus when picking up the full image and when picking up the partial image, so that the full image and the partial image are picked up within respective ranges.

In other words, when the field angle setting unit 16 is omitted, the image pickup apparatus for picking up the image of the target object in divisions as partial images which overlap by a predetermined quantity, generally includes the display unit 15 and the MPU 13. The display unit 15 functions as a display means for displaying the image. The MPU 13 functions as a partial image generating means for generating the partial image to be displayed on the display unit 15, by dividing the full image of the target object which is picked up in advance into predetermined sizes using information related to the overlap of the partial images. Therefore, it is possible to realize an image pickup apparatus which can generate a high-definition image by combining the partial images obtained by picking up the target object in divisions. In addition, it is possible to secure the necessary overlapping region that is required when combining the partial images, and to instruct the operator of the parts of the target object to be picked up so that all parts of the target object are picked up without dropout of image information.

Further, the present invention is not limited to these embodiments, but various variations and modifications may be made without departing from the scope of the present invention.

The invention claimed is:

1. An apparatus for picking up an image of a target object in divisions as a plurality of partial images which overlap, comprising:
   a field angle setting unit configured to set a field angle with which the target object is to be picked up;
   a calculating unit configured to calculate the field angle from information of the target object and a resolution;
   a display unit configured to display an image; and
   a generating unit configured to generate the partial images to be displayed on the display unit by dividing an image of the target object which is picked up with the field angle.

2. The apparatus as claimed in claim 1, further comprising:
   a calculating unit configured to calculate the field angle from information of the target object.

3. The apparatus as claimed in claim 1, wherein the display unit simultaneously displays a divided image and an image presently being picked up in an overlapping manner.

4. An apparatus for picking up an image of a target object in divisions as a plurality of partial images which overlap, comprising:
   a field angle setting unit configured to set a field angle with which the target object is to be picked up;
   a display unit configured to display an image;
   a generating unit configured to generate the partial images to be displayed on the display unit by dividing an image of the target object which is picked up with the field angle; and
   a calculating unit configured to calculate the field angle from a size of the target object and a resolution.

5. The apparatus as claimed in claim 4, further comprising:
   an object size specifying unit configured to specify the size of the target object.

6. An apparatus for picking up an image of a target object in divisions as a plurality of partial images which overlap, comprising:
   a field angle setting unit configured to set a field angle with which the target object is to be picked up;
   a display unit configured to display an image;
   a generating unit configured to generate the partial images to be displayed on the display unit by dividing an image of the target object which is picked up with the field angle; and
   a calculating unit configured to calculate the field angle from a distance to the target object and a resolution.

7. The apparatus as claimed in claim 6, further comprising:
   a measuring unit configured to measure a distance to the target object.

8. A method of picking up an image of a target object in divisions as a plurality of partial images which overlap, comprising:
   setting a field angle with which the target object is to be picked up;
   calculating the field angle from information of the target object and a resolution;
   displaying an image on a display unit; and
   generating the partial images to be displayed on the display unit by dividing an image of the target object which is picked up with the field angle.

9. The method as claimed in claim 8, further comprising:
   calculating the field angle from information of the target object.

10. The method as claimed in claim 8, wherein the displaying comprises simultaneously displaying on the display unit a divided image and an image presently being picked up in an overlapping manner.

11. A method of picking up an image of a target object in divisions as a plurality of partial images which overlap, comprising:
    setting a field angle with which the target object is to be picked up;
    displaying an image on a display unit;
    generating the partial images to be displayed on the display unit by dividing an image of the target object which is picked up with the field angle; and
    calculating the field angle from a size of the target object and a resolution.

12. The method as claimed in claim 11, further comprising:
    specifying the size of the target object.

13. A method of picking up an image of a target object in divisions as a plurality of partial images which overlap, comprising:
    setting a field angle with which the target object is to be picked up;
    displaying an image on a display unit;
    generating the partial images to be displayed on the display unit by dividing an image of the target object which is picked up with the field angle; and
    calculating the field angle from a distance to the target object and a resolution.

14. The method as claimed in claim 13, further comprising:
    measuring a distance to the target object.

15. An apparatus for picking up an image of a target object in divisions as a plurality of partial images which overlap, comprising:
    field angle setting means for setting a field angle with which the target object is to be picked up;
    calculating means for calculating the field angle from information of the target object and a resolution;
    display means for displaying an image; and
    generating means for generating the partial images to be displayed on the display unit by dividing an image of the target object which is picked up with the field angle.

16. The apparatus as claimed in claim 15, further comprising:
    calculating means for calculating the field angle from information of the target object.

17. The apparatus as claimed in claim 15, further comprising:
    means for measuring a distance to the target object.

18. An apparatus for picking up an image of a target object in divisions as a plurality of partial images which overlap, comprising:
    field angle setting means for setting a field angle with which the target object is to be picked up;
    display means for displaying an image;
    generating means for generating the partial images to be displayed on the display unit by dividing an image of the target object which is picked up with the field angle; and
    calculating means for calculating the field angle from a size of the target object and a resolution.

* * * * *